(12) United States Patent
Lally

(10) Patent No.: US 7,776,179 B2
(45) Date of Patent: Aug. 17, 2010

(54) FIRE-RETARDANT, METHOD FOR MANUFACTURING FIRE-RETARDANT CELLULOSE-BASED

(76) Inventor: Thomas J. Lally, 603 Mallard La., Oak Brook, IL (US) 60523

( * ) Notice: Subject to any disclaimer, the term of this patent is extended or adjusted under 35 U.S.C. 154(b) by 1115 days.

(21) Appl. No.: 11/430,326

(22) Filed: May 8, 2006

(65) Prior Publication Data

US 2006/0218733 A1 Oct. 5, 2006
US 2009/0077760 A9 Mar. 26, 2009

Related U.S. Application Data

(63) Continuation-in-part of application No. PCT/US2004/037261, filed on Nov. 8, 2004.

(60) Provisional application No. 60/518,489, filed on Nov. 8, 2003.

(51) Int. Cl.
*D21D 21/14* (2006.01)
*D21D 17/66* (2006.01)
*D06M 11/71* (2006.01)
*D06M 11/79* (2006.01)
*D06M 11/36* (2006.01)
*C09K 21/04* (2006.01)

(52) U.S. Cl. .............. 162/159; 162/150; 162/157.6; 162/160; 162/205; 162/206; 162/181.2; 162/181.4; 162/181.6; 8/127.1; 8/137; 252/8.91; 252/607

(58) Field of Classification Search ........... 162/159, 162/181.2, 181.4, 181.6, 205, 206; 8/127.1
See application file for complete search history.

(56) References Cited

U.S. PATENT DOCUMENTS

| | | | | |
|---|---|---|---|---|
| 2,892,674 A | * | 6/1959 | Sause et al. | ............ 8/190 |
| 2,935,437 A | * | 5/1960 | Taylor | .......... 162/181.6 |
| 3,484,183 A | * | 12/1969 | Peters et al. | ............ 8/116.1 |
| 3,701,712 A | * | 10/1972 | Samuelson et al. | ........ 162/65 |
| 3,718,537 A | * | 2/1973 | Kawai et al. | ........ 162/157.7 |
| 3,895,998 A | | 7/1975 | Haywood | |
| 4,174,223 A | | 11/1979 | Steen | |
| 4,506,684 A | * | 3/1985 | Keritsis | ............ 131/369 |
| 4,731,265 A | | 3/1988 | Hirao | |
| 4,981,518 A | | 1/1991 | Sachs | |
| 5,695,609 A | * | 12/1997 | Petander et al. | ........ 162/164.1 |
| 6,533,821 B1 | * | 3/2003 | Lally | ............ 623/23.62 |
| 7,429,290 B2 | * | 9/2008 | Lally | ............ 106/18.14 |
| 2004/0194647 A1 | | 10/2004 | Lally | |
| 2004/0194657 A1 | * | 10/2004 | Lally | ............ 106/18.12 |

FOREIGN PATENT DOCUMENTS

JP 54-138060 10/1979

* cited by examiner

*Primary Examiner*—Joseph D Anthony

(57) ABSTRACT

The present invention imparts fire-retardancy upon cellulosic products utilizing a cost-effective, non-toxic, and reliable process. Unlike previous methods which impart superficial fire-retardant coatings upon finished products, the present process treats the individual cellulosic particles (i.e. fibers, chips etc.) that make up cellulose-based particle products. Treating the individual particles provides fire-retardancy throughout the entire length and width of the product. This full-depth retardancy provides superior protection, especially in catastrophic fires where the surface coat of other products can be compromised.

14 Claims, No Drawings

FIRE-RETARDANT, METHOD FOR MANUFACTURING FIRE-RETARDANT CELLULOSE-BASED

RELATION TO PREVIOUS APPLICATIONS

This application is a continuation-in-part application of International Application No. PCT/US/04/037261, filed on Nov. 8, 2004, which is related to and claims priority of U.S. Provisional Patent Application No. 60/518,489, filed on Nov. 8, 2003, all of which are hereby incorporated by reference in their entireties.

TECHNICAL FIELD

The present invention relates to a method for manufacturing fire-retardant materials. The present invention is particularly well suited for providing fire-retardancy to products made from cellulosic or lignin-cellulosic fibers, chips, shavings and/or particles used to produce products including but not limited to fiberboards, wall boards, panels, roofing materials, particle-boards, ceiling tiles, soundproofing boards, and other products.

BACKGROUND ART

Cellulose-based products made from cellulosic fibers, chips, and shavings make up a significant portion of the building product market because they are cost effective, easy to work with, and environmentally friendly. Cellulose-based products provide structural support, act as roofing substrates, and dampen unwanted noise. Unfortunately, traditional cellulose-based products are also flammable. A number of methods have been developed to reduce the flammability of such materials, but many current methods are inadequate at providing fire-retardancy, are too expensive, or have some other shortcoming.

For example, U.S. Pat. No. 6,518,333 issued to Liu et al., on Feb. 11, 2003, teaches a fire-retardant cellulosic product comprising: a cellulosic material, at least one polymeric binder resin, and fire retardant solid particles compressed together to form a panel. While products produced according to Liu have some degree of fire-retardancy, they fail to qualify for the Class A rating for ASTM E-84. Furthermore, products that use polymeric resins can sometimes create toxic off gases when exposed to flames for extended periods time.

U.S. Pat. No. 5,840,105 issued to Helmsetter et al., on Nov. 24, 1998, discloses a fire-resistant solution for application to the surface of cellulosic materials comprising: water, pure white clay, fine mica and sodium silicate. Surface coatings like that described in Helmsetter '105 provide flame resistance to the surface of cellulosic materials, however, they fail provide full depth fire protection.

A need exists for a method that provides reliable full-depth fire-retardancy to cellulose-based particle products that is cost effective, and is non-toxic.

DISCLOSURE OF INVENTION

The present invention imparts fire-retardancy upon cellulosic products utilizing a cost-effective, non-toxic, and reliable process. Unlike previous methods which impart superficial fire-retardant coatings upon finished products, the present process treats the individual particles (i.e. fibers, chips etc.) that make up cellulose-based particle products. Treating the individual particles provides fire-retardancy throughout the entire length and width of the product. This full-depth retardancy provides superior protection, especially in catastrophic fires where the surface coat of product is often compromised.

DETAILED DESCRIPTION OF THE INVENTION

The present invention imparts full-depth fire-retardancy upon cellulosic particle products utilizing a cost-effective, non-toxic, and reliable process. For the purpose of this disclosure, the term 'cellulosic particle products' ("CPPs") is defined as any product that is made from cellulosic (or lignin-cellulosic) materials like wood fibers, wood chips, sawdust, bagasse, pulp extracts and other cellulosic fibers, particles and waste. CPPs encompass fiberboards, particleboards, medium density fiberboard (MDF), furniture board, fire-resistant panels, and other cellulosic particle products. It is important to note that the process may also be used to impart fire-retardancy to a number of non-cellulosic particulate products as well as cellulosic hard boards.

The method of one embodiment of the present invention generally comprises the following:

1. Mixing a cellulosic (or lignin-cellulosic) material with an aqueous solution (i.e. water) and a phosphate (i.e. MKP), forming a phosphate-cellulose slurry;
2. Mixing a metal oxide composition with the phosphate-cellulose slurry forming a phosphate-oxide-cellulose slurry, the slurry containing treated cellulosic material;
3. Removing the treated cellulosic material from the aqueous portion of the phosphate-oxide cellulose slurry;
4. (optional) Compressing the cellulose material forming a compressed cellulose material;
5. Drying the compressed cellulose material.

The preferred order of the steps is shown above, however, some of the steps of the method can be changed.

For example the cellulosic material can be mixed with an aqueous solution (i.e. water) and a metal oxide to form a metal oxide-cellulose slurry first followed by the addition of a phosphate compound (MKP or MKP plus a silica containing compound) to the aqueous metal oxide-cellulose slurry to form the oxide-phosphate cellulose slurry. The oxide-phosphate-cellulose slurry has similar characterstics as the phosphate-oxide cellulose slurry described herein. Other steps are also similar to what is described below.

Mixing a Cellulosic (or Lignin-Cellulosic) Material with an Aqueous Solution and a Phosphate, to Form a Phosphate-Cellulose Slurry The first step of the present invention involves mixing a cellulose material with an aqueous solution and a phosphate to create a phosphate-cellulose slurry. In a preferred embodiment of the invention the cellulosic material is mixed with the aqueous solution (i.e. water) prior to the addition of the phosphate. Once combined, all three components are mixed. for between about 30 seconds and 20 minutes, or for sufficient time to ensure a relatively homogeneous mixture. Mixing can be achieved using a variety of methods including agitation. The aqueous solution is preferably water. Alternatively, the phosphate and aqueous solution may be combined prior to the addition of the cellulose material.

TABLE 1

Exemplary weight percent for the phosphate-cellulose slurry

| | Phosphate (i.e. MKP) | Aqueous Solution (i.e. water) | Cellulose Material |
|---|---|---|---|
| Exemplary Range | ~0.5-40 wt. % | ~50-99 wt. % | ~0.5-50 wt. % |
| Preferred Range | ~0.5-15 wt. % | ~75-98 wt. % | ~1-15 wt. % |
| Commercial Range | ~0.7-5 wt. % | ~90-97 wt. % | ~2-10 wt. % |

Table 1 provides exemplary weight percent ranges for the various components present in the phosphate cellulose slurry. Generally the cellulose materials make up between approximately 0.5-50 weight percent of the phosphate-cellulose slurry. The amount of cellulose present will depend on a variety of factors. When using small cellulosic fibers a preferred weight percent range for the cellulose material is between about 1-15 wt. % of the mixture, more preferably about 2-10 wt. %. The cellulose-based material can be virtually any type of cellulose, however, it is preferably comprised of fibers, shavings, small chips or other fine cellulose particles with high surface-area to weight ratios. The high surface-area to weight ratio allows the materials to absorb the aqueous solution (and the added phosphates and oxides) more rapidly and to a greater degree. It should be also be noted that various non-cellulosic materials can be used in place of cellulose materials. Treating hardboards (or similar large products) may cause the percentages to vary.

As noted in Table 1 the aqueous solution (i.e. water) is generally present at between about 50-99 wt. percent of the phosphate-cellulose slurry, preferably at a range of between about 75-98 wt. %, and even more preferably between 90-97 wt. %. Increasing the amount of water generally reduces the cost of production and increases the flowability of the slurry. A suitable temperature range for the water (aqueous solution) is between about 40-180° F., more preferably between 60-160° F.

As described in table 1, the phosphate is present at between about 0.5-40 wt. percent of the phosphate-cellulose mixture, a more cost-effective range being between about 0.5-15 weight percent, a more preferred range being between about 0.7-5 wt. %.

Suitable phosphates include phosphoric acid or, phosphoric acid salts including but not limited to mono-potassium phosphate ("MKP"), sodium phosphate, ammonium phosphate, aluminum phosphate and combinations thereof. MKP ($KH_2PO_4$) is the most preferred phosphate. Dry phosphates are generally utilized but other forms can also be envisioned.

Addition of the Metal Oxide Composition

A metal oxide mixture is added to, and mixed with the phosphate-cellulose slurry to form a phosphate-oxide-cellulose slurry. The phosphate-oxide-cellulose slurry is mixed for between about 30 seconds and 20 minutes, or until the slurry is well-mixed. Mixing can be achieved by several techniques well known in the art including but not limited to agitation. The metal oxide reacts with the phosphate in the cellulose slurry in an exothermic reaction. Evidence of the reaction can be seen in a raise in the slurry temperature and pH. Dry oxide (or hydroxides) are used but other forms can be employed.

(when the weight percent ratio between the cellulose material and the combination of phosphate and metal oxide (i.e. MKP+MgO) is between approximately 2:1 or less, and possibly as high as 5:1 or 10:1) of the phosphate-oxide slurry while maintaining fire-retardancy. Thus unexpectedly the method can provide fire protection using phosphate and metal oxide even when using less than 3 wt. percent each. The percentages can be varied according to conditions and desired results.

Metal Oxide Mixture

As indicated in table 2, the metal oxide mixture is generally present at between 0.5-30 wt. % of the phosphate-oxide cellulose mixture. MgO is the preferred metal oxide. Other metal oxides (and/or hydroxides) may be utilized in place of, or in addition to, MgO, including but not limited to FeO, $Al(OH)_3$, aluminum oxides, calcium oxides, $Fe_2O_3$, TiO, ZrO, and $Zr(OH)_4$. It is believed that the metal oxide reacts with the phosphate present on the surface of (and possibly inside) the cellulose material. The reaction between the metal oxide and phosphate creates a composition which impart fire-retardancy upon the individual piece of cellulose material.

It was found that it was beneficial to use MgO that is part light burned (calcined between 700-1000° C.) and part hard burned (calcined at between 1000-1500° C.). The ratio between the hard and light burned generally between (0.5-2):1.

A salient feature of the present invention is the ratio between the phosphate (i.e. MKP) and the metal oxide/hydroxide (i.e. MgO). A preferred embodiment has a weight percent ratio between MKP and MgO between 5:1 and 1:5, more preferably between approximately 2:1 and 1:1. The weight ratio between MKP and MgO influences reaction rate between the metal oxide and phosphate and thus the ability of each to attach to and coat the cellulosic particles.

Another important aspect of the invention is the weight percent ratio between the cellulose material and the combination of phosphate and metal oxide (i.e. MKP+MgO). Generally the ratio should be less than 10:1, preferably less than 5:1 and more preferably around 2:1. A proper ratio between phosphate, oxide and cellulose ensures that all the cellulose material is adequately treated.

Silica-Containing Compound

A salient feature of at least one embodiment of the invention is the presence of a silica-containing compound in the

TABLE 1

Exemplary weight percent for the phosphate-cellulose slurry

| | Phosphate | Aqueous Solution (i.e. water) | Cellulose Material | Metal Oxide Mixture |
|---|---|---|---|---|
| Exemplary Range | ~0.5-35 wt. % | ~50-98 wt. % | ~0.5-40 wt. % | ~0.5-30 wt. % |
| Preferred Range | ~0.5-10 wt. % | ~70-98 wt. % | ~2-10 wt. % | ~0.5-10 wt. % |
| Commercial Range | 1-3 wt. % | ~85-97 | ~2-10 wt. % | ~0.5-2 wt/% |

Table 2 provides exemplary weight percents for the phosphate-oxide cellulose slurry. In general one might assume a higher percentage of phosphate and metal oxide mixture corresponds to higher level of protection. However when the process is being used in large scale commercial production it is cost effective to reduce the amount of phosphate and metal oxide mixture as they are the most expensive reagents.

Surprisingly it was found that phosphate and metal oxide amounts could be reduced to a few weight percent or less phosphate-oxide cellulose mixture. The silica-containing compound can be added at any step prior to removal of the cellulose material from the slurry. Generally, the silica-containing compound is present at between 0.5 and 20 wt. % of the phosphate-oxide-cellulose mixture, more preferably between about 0.5 and 5 wt. % for commercial uses.

In one preferred embodiment the silica containing compound is mixed with the metal oxide prior to the addition of the metal oxide composition to the phosphate cellulose slurry.

This metal oxide-silica mixture comprises: a metal oxide and a silica containing compound where the weight ratio between the metal oxide and silica containing compound is generally between (0.5-2):1. Suitable silica containing compound(s) include but are not limited to: silica powder, silica fume, crushed rice hulls, small particle fly ash, and combinations thereof. Silica powder is preferred: The silica containing compound is believed to act as a carrier for the MgO (or phosphate), assisting in the reaction between the metal oxide and the phosphate.

Holding Times/Additional Mixing

Each mixing step is preferably held for a period of time to ensure adequate absorption/reaction of the mixture components. A series of mixing/holding steps can be employed to ensure proper reactivity and homogeneity. Hold times can vary, however hold times ranging from about 30 seconds to 20 minutes are suitable. Alternatively, the slurry can be allowed to sit for a period following mixture.

Additives

Various additives can be added to the phosphate-oxide cellulose mixture. The additives can be added at any step prior to removal of the cellulose material from the phosphate-oxide-cellulose slurry. Suitable additives include but are not limited to: mullite, alumina, sand, clay, volcanic glasses, kyanite, bauxite, aluminum oxide, silicon oxide, chrome oxide, iron oxide, and mixtures thereof. Preferred additives include calcium containing compounds including but note limited to: calcium phosphates, tricalcium phosphates (such as hydroxyapatite), biphasic calcium phosphate, tetracalcium phosphate, $CaSiO_3$, and combinations thereof. Tricalcium phosphates such as hyroxyapatite, $CaSiO_3$ and combinations thereof being the most preferred.

Separating/Removing Cellulose Material from Dhosphate-Oxide Cellulose Slurry

After sufficient mixing the cellulose material is removed and separated from the aqueous portion of the phosphate-oxide-cellulose slurry. The cellulose materials can be removed by a number of techniques well known in the art including but not limited to physical removal from the solution, and draining off the aqueous solution. In one embodiment the cellulose materials are physically taken out in clumps and spread out for on a porous support for drying.

In another embodiment the phosphate-oxide cellulose slurry can be transferred into a moving (or stationary) draining bed in which the aqueous solution is drained away from cellulose material by gravity or other means. Other separation means can also be employed including straining the cellulose material from aqueous portion of the slurry.

Compression

After the cellulose materials have been removed and drained from the phosphate-oxide-cellulose slurry the cellulose materials (i.e. fibers, particles) can be compressed using a variety of methods well known in the art including the use of rollers. The cellulose materials can be compressed into variety of shapes, sizes, lengths and widths.

Drying Cellulose Material

Drying the cellulose material can be achieved by several techniques known in the art including heating in an oven or a series of ovens. The cellulose material should be heated at temperature and for a time period sufficient to produce cellulose products with a water content of less than 10% by weight, more preferably less than 5% by weight. Exemplary temperatures are between 100-1000° F. Suitable time ranges are between about 5 minutes and about 2 hours.

Commercial Production

The present process can be utilized in conjunction with other known methods of manufacturing cellulose particle products like fiberboard, particle board and the like. See, U.S. Pat. Nos. 6,197,414; 4,935,457; 4,597,928; 4,311,555; 4,190,492 which are hereby incorporating by reference in their entirety. The fibers, chips, or other cellulose particles can be treated first using the present process and can then be used known manufacturing process. Alternatively, known processes can incorporate the present process.

A suitable temperature range for the water being mixed with the phosphate powder is between 40-180° F. The temperature of the water is related to the mixtures reactivity, thus the rate of the reaction can be controlled to some degree by the temperature of the water being added. Warm water tends to speed up the reaction while cool water tends to slow it down. The temperature of such reagents, like that of water can affect the reactivity of the mixtures and can be used to regulate the reaction to a limited degree. Again, warm reagents may speed up the reaction while cool reagents tend it slow them down.

The treated cellulose material can be coated with other various fire-retardant coatings especially various coatings and compositions invented by present inventor including but not limited to those disclosed in U.S. Pat. Nos. 6,533,821 and 6,787,495.

Mixing Containers

The invention can be mixed in a variety of container types. The container is preferably non-reactive with the slurry components and can vary in size and shape according to desired results. An alternate embodiment uses a series of containers. The steps of the invention can be repeated for increase effectiveness.

The examples below provide exemplary formulations for various embodiments of the present invention.

Example I

Water+Cellulose Material+(MgO/Silica Powder mixture)

60,000 lbs of water having a temperature of approximately 140° F. was combined with 3000 lbs of cellulosic fiber forming a cellulosic slurry having a pH between 3.1 and 3.2. 1000 lbs of MKP was added to, and mixed with the cellulosic slurry to form a phosphate cellulose mixture having a pH of between 3.9 and 4.0. The phosphate-cellulose slurry was held for 5 minutes. 1000 lbs of a MgO/Silica composition was added to, and mixed with the phosphate-cellulose slurry creating a phosphate-oxide cellulose slurry having a pH of between 5.8 and 6.0. (hold 5 minutes and then mix again) The MgO/Silica composition was composed of (250 lbs hard burned MgO, 250 lbs light burned MgO and 500 lbs of silica powder (formula). Mixing was achieved by agitation. After mixing the treated cellulose fibers were separated from the aqueous portion of the slurry (by draining the solution), compressed through a series of rollers and dried using a series of ovens.

Example II

MKP+Water+Cellulose Material+(MgO/Silica Powder mixture)

3 g of MKP were mixed with 90 g of water to form a well-mixed aqueous phosphate solution. 4 g of cellulose fibers was added to the aqueous phosphate solution and hand mixed for 2 minutes forming a well-mixed phosphate-cellulose slurry. 3 g of MgO/Silica mix was added to the phosphate-cellulose slurry and hand mixed for another 2 minutes forming a phosphate-oxide cellulose slurry. The MgO/Silica slurry was composed of (0.75 g hard burned MgO, 0.75 g of light burned MgO and 1.5 g of silica powder. After mixing was complete, the aqueous portion of the phosphate-oxide-solution was drained and the cellulose fibers were dried in an oven at approximately 500° F.

Alternative Embodiments

Method for imparting fire-retardancy upon materials comprising:
a. Mixing a cellulose material with a first aqueous solution forming a first cellulose slurry;
b. Separating/removing the cellulose material from the first cellulose slurry;
c. Mixing the removed cellulose-based material with a second aqueous solution forming a second cellulose slurry, the second slurry containing treated ceullose material.
d. Separating/removing the treated cellulose material from the second cellulose slurry.

The first aqueous can be either an aqueous phosphate solution or an aqueous metal oxide solution. The second aqueous solution can also be either a phosphate or metal oxide solution, however, it should be different than the first slurry. For example if the first slurry contains a phosphate solution than the second should contain a metal oxide and vis versa.

For further example, the first phosphate solution can be generally between about 0.5-40 wt. percent phosphate and about 60-99 wt. percent water, preferably between about 1-10 percent phosphate and about 90-99 wt. percent water. The second aqueous solution is generally about 1-40 wt. percent metal oxide and about 60-99 wt. percent water, peferably between about 0.5-10 wt. percent metal oxide and about 90-99.5 wt. percent water.

The cellulose generally comprises about 0.545 wt. percent of the first and second slurries, preferably between about 0.5-10 wt. percent. The types of phosphate and oxides, ratios and other general features are similar to the embodiment already described.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefor, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

I claim the following:

1. Method for imparting fire-retardancy upon cellulosic materials comprising:
   a. mixing a cellulosic material, an aqueous solution, and a potassium phosphate forming a phosphate-cellulose slurry;
   b. after formation of the phosphate-cellulose slurry, mixing a metal oxide composition with the phosphate-cellulose slurry forming a phosphate-oxide-cellulose slurry containing treated cellulosic material;
   c. separating or removing the treated cellulose material from the rest of phosphate-oxide-cellulose slurry, wherein the cellulosic material comprises: fibers, chips, or other cellulose particles.

2. The method of claim 1, wherein the potassium phosphate is $KH_2PO_4$, the phosphate-cellulose slurry is at least about 75 weight percent water, and wherein the phosphate-oxide-cellulose slurry contains a silica containing compound selected from the group consisting of: silica powder, silica fume, crushed rice hulls and combinations thereof.

3. The method of claim 1, wherein the phosphate-cellulose slurry is mixed and then held for between about 30 seconds and 20 minutes to allow absorption before the metal oxide is mixed in.

4. The method of claim 1, wherein the phosphate-oxide-cellulose slurry mixed and then held for between about 30 seconds and 20 minutes to allow absorption before the treated cellulose material is separated or removed from the rest of the phosphate-oxide-cellulose slurry.

5. The method of claim 1, wherein the phosphate-cellulose slurry is at least 90 weight percent water.

6. The method of claim 1, wherein the potassium phosphate is $KH_2PO_4$.

7. The method of claim 1, wherein the potassium phosphate is present between about 0.5-10 weight percent of the phosphate-oxide-cellulose slurry; the metal oxide is between about 0.5 and 10 weight percent of the phosphate-oxide-cellulose slurry; and the cellulosic material is between about 2 and 10 weight percent, of the phosphate-oxide-cellulose slurry.

8. The method of claim 1, wherein the cellulosic material comprises between 1-15 weight percent of the phosphate-cellulose slurry.

9. The method of claim 1, wherein the metal oxide is between about 0.5 and 2 weight percent of the phosphate-oxide-cellulose slurry; the potassium phosphate is between about 1-3 weight percent of the phosphate-oxide-cellulose slurry; and the cellulosic material is between about 2 and 10 weight percent, of the phosphate-oxide-cellulose slurry.

10. The method of claim 1, wherein the metal oxide is MgO.

11. The method of claim 1, wherein the phosphate-oxide-cellulose slurry contains a silica containing compound, and wherein the silica containing compound is selected from a group consisting of: silica powder, silica fume, crushed rice hulls and combinations thereof.

12. The method of claim 1, wherein the weight percent ratio between the potassium phosphate and the metal oxide in the phosphate-oxide-cellulose slurry is between 5:1 and 1:5.

13. The method of claim 1 further comprising the step of: compressing the treated cellulosic material forming a compressed cellulosic material.

14. The method of claim 1 further comprising the step of: drying the treated cellulosic material.

* * * * *